Dec. 4, 1951 W. R. JOHNSON 2,577,015

SWITCHING SYSTEM

Filed March 22, 1949 2 SHEETS—SHEET 1

WAYNE R. JOHNSON,
INVENTOR.

BY Robert O. Fulwider
ATTORNEY.

WAYNE R. JOHNSON,
INVENTOR.

BY Robert W. Fulwider
ATTORNEY.

Patented Dec. 4, 1951 2,577,015

UNITED STATES PATENT OFFICE 2,577,015

SWITCHING SYSTEM

Wayne R. Johnson, Los Angeles, Calif., assignor to Earle C. Anthony, Inc., Los Angeles, Calif., a corporation of California Application March 22, 1949, Serial No. 82,768

10 Claims. (Cl. 250—27)

My invention relates generally to switching systems and more particularly to systems of this type especially adapted for high speed switching from one circuit, such as a communication circuit, to another.

As progress has been made in television and related arts, the public has demanded improved programs and programming methods. From its experience with motion pictures, the public has demanded the changing of viewpoints and scenes in a smooth but rapid manner, results that are not obtainable by the use of a single camera. This has required the use of motion picture techniques, including the use of several cameras located to pick up various scenes and aspects of scenes; and by switching from one camera to another, the desired variety has been obtained.

However, the modern television system is somewhat complicated, and in addition to transmitting a signal corresponding to the ultimate visual image, the system also transmits synchronizing pulses that insure the proper alignment and synchronization of the received picture. If manually operated switches are directly used to effect the switching from one camera to another, the switching is not sufficiently fast to insure that all of the synchronizing impulses will be transmitted, and consequently there is frequently a complete loss of synchronization for a few seconds, causing displeasure and annoyance on the part of the viewing public.

While mechanically operated switches can be made that operate to open or close the circuit in a very short period of time, the use of such switches becomes mechanically involved when any one of a number of such switches is to be closed and the others are to be simultaneously opened. Consequently, the use of purely mechanical switching means has not been found satisfactory.

It is therefore a major object of my invention to provide a switching system designed to provide substantially instantaneous opening or closing of an associated circuit.

Another object of my invention is to provide a system of this type wherein the closing of one of the switching elements acts to open the remainder of the switching elements.

It is a further object of my invention to provide a system of simple and compact design that may easily be incorporated in existing facilities.

Still another object of my invention is to provide a switching system for a plurality of circuits that insures a minimum of inter-modulation between such circuits.

It is a still further object of my invention to provide a system having these advantages that is quickly and easily constructed of well-known and readily available components.

Figure 1:
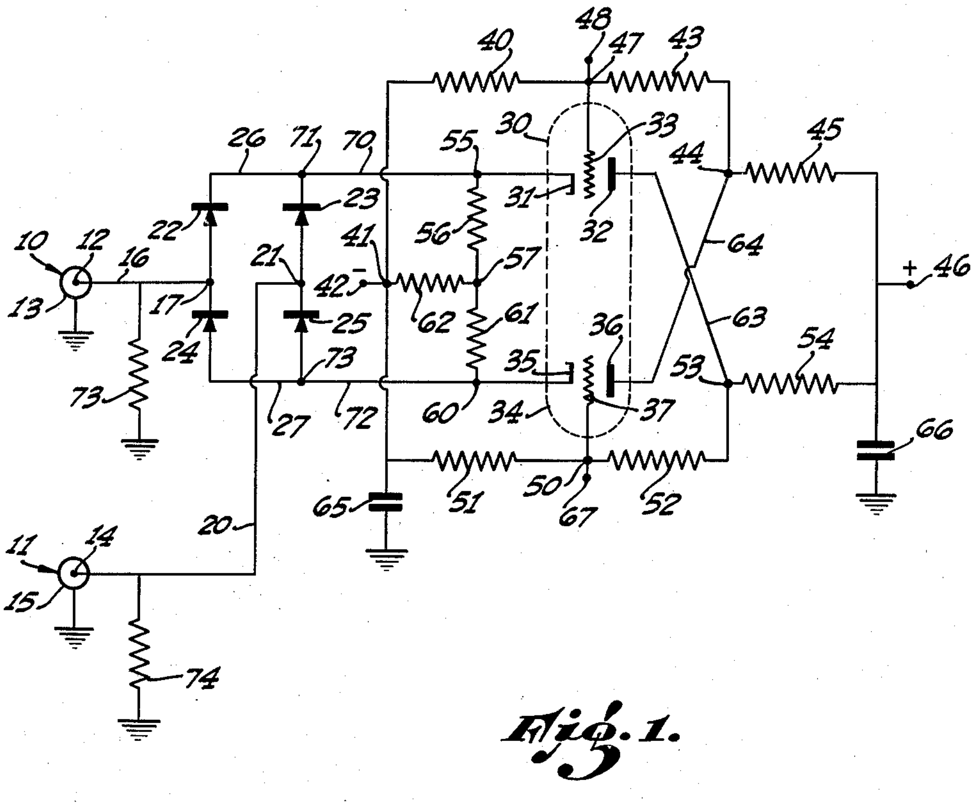
Figure 2:
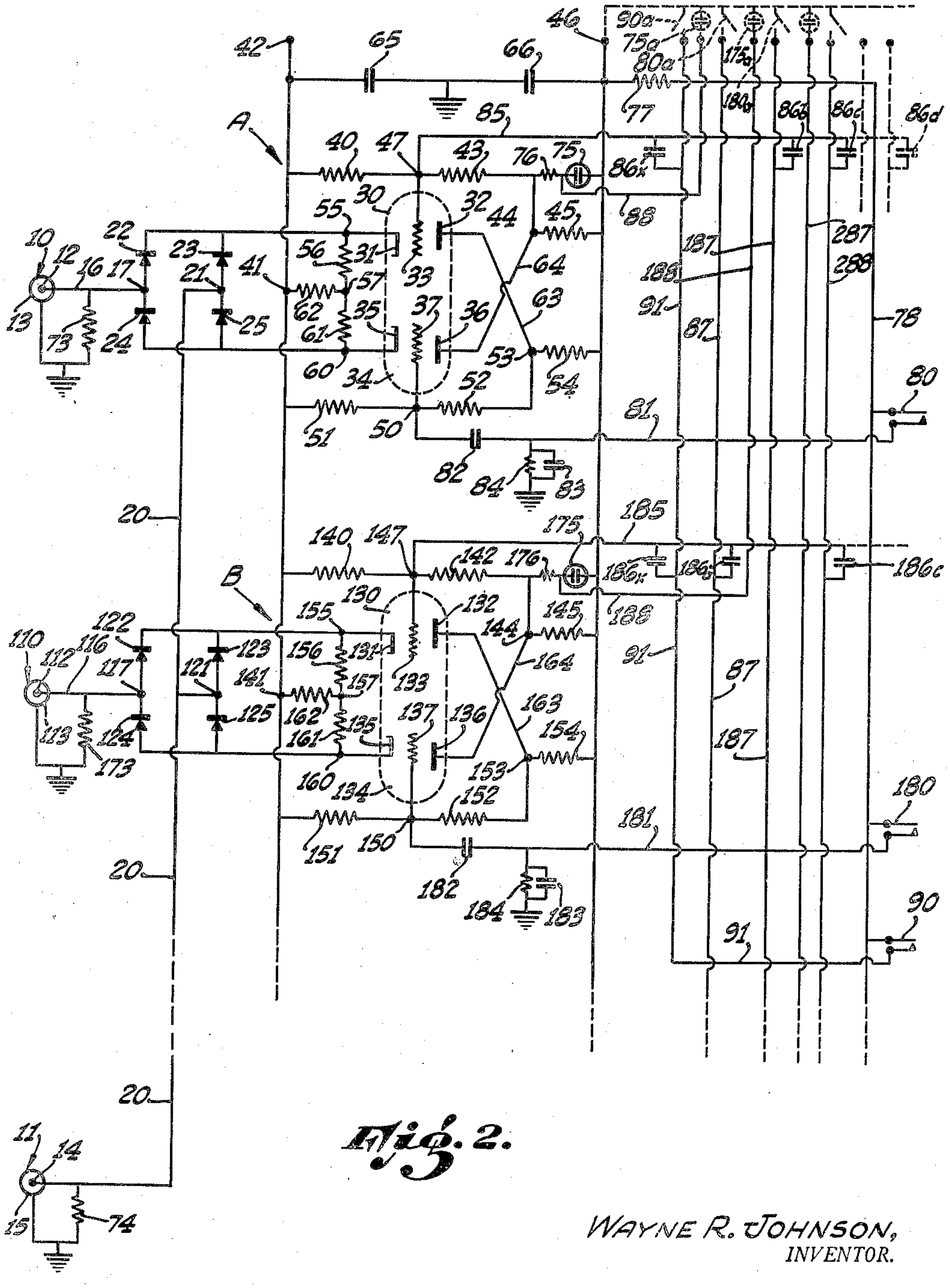

These and other objects and advantages of my invention will become apparent from the following description of a preferred form thereof, and from the drawings illustrating that form in which Fig. 1 is a schematic diagram of a single switching element of my complete system; and Fig. 2 is a schematic wiring diagram of a complete switching system that may be expanded to control any desired number of circuits.

Referring now to the drawings and particularly to Fig. 1 thereof, the numeral 10 designates generally an incoming circuit conductor that is to be switched to and from an outgoing circuit conductor 11. Because of the frequency of television signals, the conductors 10 and 11 will generally take the form of coaxial cables, the conductor 10 having an inner conductor 12 and a shell or outer conductor 13. Similarly, the conductor 11 will have an inner conductor 14 and a shell or outer conductor 15, it being customary to ground the outer conductor of each of said cables. An input conductor 16 leads from the center conductor 12 of the coaxial cable 10 to an input terminal 17 of the switching element, and an output lead 20 extends from an output terminal 21 of the switching element to the center conductor 14 of the coaxial cable 11. Fundamentally, of course, the switching is accomplished by establishing and interrupting an electrical connection between the input terminal 17 and the output terminal 21, and this is accomplished in the manner now to be described.

As seen in Fig. 1, the input and output terminals 17 and 21 are junction points of a network that includes a plurality of unidirectional electrical conductors 22, 23, 24, and 25. Making the conventional assumption that electric current flows from positive to negative, the various unidirectional electrical conductors 22 to 25 hereinafter referred to as rectifiers, are connected so that a pair of branches are formed, both branches conducting current in the same direction. Thus, the rectifiers 22 and 24 are connected in series, with the input terminal 17 connected to the junction point between the two rectifiers. Consequently, the rectifier 24 is capable of conducting current toward the input terminal 17, while the rectifier 22 is capable of conducting current from the input terminal. The rectifiers 23 and 25 are likewise connected in series, with the output terminal 21 connected to the junction point joining those two rectifiers, so that the rectifier 25 is capable of conducting current toward the output terminal, while rectifier 23 is capable of conducting current from that terminal. The corresponding terminals of the rectifiers 22 and 23 are connected together by a conductor 26, while the opposite terminals of the rectifiers 24 and 25 are connected together by a conductor 27. The rectifiers 22 and 24 thus form one branch of the network, while the rectifiers 23 and 25 form a parallel branch, both of these branches being capable of conducting current from conductor 27 to conductor 26.

The rectifiers 22 to 25 may be of any suitable type, but I have found the germanium crystal type of rectifier to be most satisfactory, these being commercially available under the designation 1N34. Rectifiers of this type have a low resistance to current passing in one, a forward, direction, as for example from the input terminal 17 through the rectifier 22 to the conductor 26. However, the same rectifier 22 presents a very high resistance to the passage of current in the opposite or reverse direction.

If a potential difference is applied between the conductors 26 and 27, with the conductor 26 being positive with respect to the conductor 27, the rectifiers 22 to 25 will prevent the flow of any substantial amount of current between the conductors. However, if the same potential difference is applied to the conductors 26 and 27 but with the polarity reversed so that conductor 27 is positive with respect to conductor 26, the rectifiers 22 to 25 offer very little impedance to the flow of current in this direction.

If a constant potential difference is now impressed between the conductors 26 and 27, the polarity of this potential difference being such that conductor 27 is positive and conductor 26 is negative, an alternating current signal applied to the input terminal 17 will appear at the output terminal 21. This, of course, requires that the amplitude of the impressed signal be comparable to the potential difference appearing between the conductors 27 and 26, and by way of example only, and not as a limitation, I have found that if the signal applied to the input terminal 17 has an amplitude, peak to peak, of approximately two volts, very satisfactory results are obtained when the potential difference between the conductors 27 and 26 is approximately one volt.

On the other hand, if the polarity of the voltage applied to the conductors 26 and 27 is reversed so that the conductor 26 is now positive and the conductor 27 is negative, and the potential difference is increased to eight volts, substantially none of the signal applied to the input terminal 17 appears at the output terminal 21. The reason for this action of the network will be appreciated when it is recalled that the signal voltage applied to the input terminal 17 adds to or subtracts from the voltage applied to the branch of the network including the rectifiers 22 and 24. If the polarity of the voltage applied between the conductors 26 and 27 is such as to establish a current flow through the two branches of the network, the impressing of a signal voltage upon the input terminal 17 will act to modulate the flow of current through the branch containing this terminal. Because of the similarity of the two branches, a signal will appear at the output terminal 21 that is similar in all respects to that appearing at the input terminal 17.

However, when the polarity of the voltage applied between the conductors 26 and 27 is reversed so that no current flows through the two branches of the network, there is no current for the input signal to modulate, and hence no signal appears at the output terminal 21. Consequently, by making the conductor 26 considerably positive with respect to the conductor 27, the network acts as an open switch, while if the conductor 26 is made slightly negative with respect to the conductor 27, the network acts as a closed switch.

To impress the desired voltages upon the conductors 26 and 27, I have made use of a trigger circuit that has two alternate stable conditions. As is customary in such circuits, I employ two electron discharge tube sections, and I have found it very convenient to use a single tube in which both of these sections are enclosed within a single envelope. While other suitable tubes may be used, I have found the commercially designated type 6SN7 to be very satisfactory for the present circuit. Such a tube has a first section 30 including a cathode 31, an anode 32, and a control electrode 33. Similarly, the remaining section 34 includes an anode 35, a cathode 36, and a control electrode 37.

In the construction of the trigger circuit employing the sections 30 and 34, the control electrode 33 is connected through a biasing resistor 40 to a junction point 41, this junction point also being connected to a terminal 42 connected to the negative terminal of a power supply (not shown).

The control electrode 33 is also connected through a resistor 43 to a junction point 44, and from that point through a load resistor 45 to a terminal 46 that is connected to the positive terminal of the power supply. The control electrode 33, the biasing resistor 40, and the resistor 43 are thus connected to a common junction point 47, to which a control terminal 48 is likewise connected for a purpose hereinafter described.

The control electrode 37 of the section 34 is connected to a junction point 50, and from this point, is connected through a biasing resistor 51 to the junction point 41 and thence to the negative terminal 42. The junction point 50 is also connected through a resistor 52 to a junction point 53, and from this latter point through a load resistor 54 to the positive terminal 46.

The cathode 31 of the section 30 is connected to a junction point 55 and then through a resistor 56 to another junction point 57. The cathode 35 of the section 34 is connected to a junction point 60 and then through a resistor 61 to the junction point 57. To complete the cathode circuit, a resistor 62 is connected between the junction points 57 and 41. It will be appreciated, of course, that the cathodes 31 and 35 are heated by conventional means (not shown).

As customary in trigger circuits, the anode connections are interchanged, and hence the anode 32 of the section 30 is connected by a conductor 63 to the junction point 53, while the anode 36 of the section 34 is connected by a conductor 64 to the junction point 44. To complete the trigger circuit, the power supply has its negative terminal 42 connected to a capacitor 65 and then to ground, while a capacitor 66 is connected between the positive terminal 46 and ground. A terminal 67, comparable to the terminal 48, is connected to the junction point 50 so that the operating states of the trigger circuit may be separately and positively controlled.

It is thought that the operation of a trigger circuit of this type will be evident to those skilled in the art, and it is seen that if the control electrode 33 of the section 30 is momentarily made positive with respect to the cathode 31, as by a pulse applied to the terminal 48, the section 30 will be made conductive and current will flow from the anode 32 to the cathode 31. The current flowing to the anode 32 passes through the conductor 63 and the load resistor 54, producing a voltage drop through the latter, which reduces the voltage of the junction point 53 with respect to the terminal 46. At the same time, assuming that the section 34 is non-conducting, there will not be a material current flow to the anode 36 of the latter section, and consequently there will not be any great voltage drop through the load resistor 45. As a result, the junction point 44 will be at a higher voltage than the junction point 53, and the potential difference existing between the junction points 44 and 41 will be greater than that existing between the junction points 53 and 41. Since the resistors 40, 43, and 45 have values substantially equal to those of the resistors 51, 52 and 54, respectively, the potential difference existing between the junction points 47 and 41 will be greater than that existing between junction points 50 and 41. Consequently, the junction point 47 will be positive with respect to the junction point 50, and likewise the control electrode 33 will be positive with respect to the control electrode 37. As a result, the section 30 of the electron discharge tube will remain conductive and the section 34 will remain non-conductive until these conditions are reversed by some external occurrence.

If a greater positive voltage is now applied to the terminal 67, the control electrode 37 connected thereto will then become more positive than the control electrode 33. As a result, a greater current will flow through the section 34 than through the section 30, and the voltage drop through the resistor 45 will thus be greater than the similar drop through the load resistor 54. Consequently, the control electrode 37 will remain positive with respect to the control electrode 33, and the section 34 will remain conductive and the section 30 will become non-conductive.

This stable operation of a circuit in either of two conditions is a characteristic of trigger circuits, as is well known. The circuit will operate and continue to operate with either the section 30 or the section 34 conducting, but not with both sections simultaneously conducting. When the section 30 is conductive, a circuit may be traced from the positive terminal 46, through the load resistor 54 to the anode 32, then to the cathode 31 and the junction point 55, through the resistor 56 to the junction point 57, and then through the resistor 62 to the negative terminal 42 and to the power supply. While the current flowing through this circuit is not of great magnitude, it is nevertheless sufficient to produce a very material voltage drop across the load resistor 54, and similarly, a material and appreciable voltage drop is caused across the resistor 56 in the cathode circuit. As a result, the junction point 55 will be considerably more positive than the junction point 57 when the section 30 of the electron discharge tube is conductive.

In a similar manner, a circuit may be traced through the section 34 when the latter is conductive, this circuit extending from the terminal 46, through the load resistor 45 to the anode 36. From there, the circuit continues to the cathode 35 and the junction point 60, through the resistor 61 to the junction point 57, and then through the resistor 62 to the terminal 42 and to the power supply. Under these conditions, the junction point 60 is considerably more positive than the junction point 57, and hence is likewise considerably more positive than the junction point 55. Similarly, when the section 30 is conducting and the section 34 is non-conducting, the junction point 55 is considerably more positive than the junction point 60.

It will thus be seen that by the use of the just-described trigger circuit, it is possible to secure a continuous potential difference whose polarity may be reversed by the application of a pulse of very short duration. From the nature of the trigger circuit, this change of polarity occurs in a very short period of time, and by the choice of suitable components, may be made to occur within a matter of micro-seconds. This, of course, provides a substantially ideal method for switching the conductor 10 to or from the conductor 11 through the rectifier network previously described. Consequently, a conductor 70 completes a circuit from the junction point 55 to the conductor 26 at a junction point 71, while another conductor 72 completes a circuit from the junction point 60 to the conductor 27 at a junction point 73.

Because of the nature of the circuits being switched, it is desirable to have a terminating impedance connected between the central conductor 12 and the outer conductor 13 of the coaxial cable 10. Consequently, I have provided a resistor 73 connected between the conductor 16 and ground. In a similar manner, a resistor should be connected between the central conductor 14 and the outer conductor 15 of the output coaxial cable 11. The resistor 74 is therefore connected between the conductor 20 and ground, and its value is selected so that it does not cause material attenuation of the signal in the passage of the latter from the input conductor 10 to the output conductor 11. These requirements would indicate that the resistor 74 should have a fairly high value, but if too great a resistance is used, there will be a considerable amount of "cross-talk" in the higher frequencies. Consequently, the value of the resistor 74 represents a compromise between the two desired characteristics, and I have found that if it has a value of approximately 1200 ohms, very satisfactory results will be obtained.

It is believed that the operation of the switching section shown in Fig. 1 will by now be apparent. Assuming first that the input conductor 10 is not to transmit its signal to the output conductor 11, the section 30 of the electron discharge tube will be in a conductive condition, with current flowing through the load resistor 54 and the resistor 56 to make the junction point 55 positive with respect to the junction point 60. The potential difference appearing between the junction points 55 and 60 is applied to the conductors 26 and 27, the polarity being such that no current flows through the rectifiers 22 to 25, inclusive. As previously mentioned, this potential difference is sufficient to prevent any transfer of the incoming signal from the conductor 10 to the conductor 11, and hence the system acts as though there were an open circuit between the input conductor 10 and the output conductor 11.

To operate the switching section so that the signal is transmitted to the output conductor 11, the terminal 67 connected to the control electrode 37 of the section 34 is momentarily connected to the positive terminal of a source of electrical energy, thereby driving the control electrode 37 positive and rendering the section 34 conductive. When this occurs, the section 30 immediately becomes non-conductive, and the junction point 60 becomes positive with respect to the junction point 55. Under these circumstances, conductor 27 is made positive with respect to conductor 26, and current will flow through the rectifiers 22 to 25 inclusive. Since there is this current flow, the potential difference between the conductors 26 and 27 will not be as great under these conditions as when the polarity is reversed. However, the voltage is of the proper magnitude to establish the transfer of the signal from the input terminal 17 to the output terminal 21 of the rectifier network. Consequently, the same result has been obtained as if a mechanically operated switch were instantaneously closed.

For a more complete understanding of the switching section, the following values of the various components thereof have been found to operate very satisfactorily, it being understood that these values are by way of example only and not as a limitation.

| Resistors | Value |
|---|---|
| | Ohms |
| 40 | 47,000 |
| 43 | 150,000 |
| 45 | 27,000 |
| 51 | 47,000 |
| 52 | 150,000 |
| 54 | 27,000 |
| 56 and 61 | 1,000 |
| 62 | 5,000 |
| 73 | 72 |
| 74 | 1,200 |

Capacitors 65 and 66 ........ 8μf.
Rectifiers 22 to 25 ........ 1N34
Electron discharge tube sections 30 and 34 ........ ½ of 6SN7GT

*Description of Figure 2*

While it will be apparent that my improved switching section has considerable value when used alone, it will likewise be seen that it will find its greatest field of usefulness where it is combined with similar sections so that any one of a plurality of input circuits may be instantly connected to the conductor 11 leading to a single output circuit. In Fig. 2, I have illustrated how two such sections may be combined, it being understood that additional circuits and switching sections may be added as circumstances demand. In the system shown, for example, a first switching element A is operable to connect or disconnect an input circuit conductor 10 and an output circuit conductor 11. Similarly, a second switching element B is operable to connect a second input cable 110 to the output cable 11, and additional switching elements and input cables (not shown) may be added as desired.

Referring first to switching element A, it will be noted that this includes the rectifier network and the trigger circuit previously described and explained in connection with Fig. 1. One addition has been made to the basic circuit, and this includes an indicator or tell-tale lamp 75 of the neon glow type connected to the positive terminal 46 of the power supply, and in series with a resistor 76 to the junction point 44. In this manner, when the switching section A acts to transmit a signal from the input cable 10 to the output cable 11, the section 34 of the electron discharge tube is rendered conductive and a considerable potential difference appears between the terminals of the resistor 45. This potential difference is applied to the series circuit including the lamp 75 and the resistor 76, thereby causing the lamp to glow so that an indication of the operation of this switching section is secured. When the switching section A is operated so that no signal is transmitted from the input cable 10 to the output cable 11, i. e., the section is non-transmissive, the section 34 of the electron discharge tube is rendered non-conductive and the voltage drop through the load resistor 45 is insufficient to cause the glowing of the indicator lamp 75.

A simple circuit arrangement is used to furnish the pulses of electrical energy necessary to operate the control elements 33 and 37 to render the network transmissive or non-transmissive. Clearly, there is no need for applying a control voltage continuously to the junction point 50, once the control electrode 37 has been driven positive and the section 34 of the electron discharge tube has been rendered conductive. These considerations suggest that a capacitor be used to insure that only a pulse of voltage be transmitted to the junction point 50, and this is the method I have found to be very satisfactory.

In the embodiment shown, a resistor 77 has one of its terminals connected to the positive terminal 46 of the power supply, and the other terminal of the resistor is connected to a conductor 78. A momentary contact switch 80 has one of its terminals connected to the conductor 78, and the other terminal thereof is connected by a conductor 81 to one terminal of a capacitor 82. The other terminal of the capacitor 82 is connected to the junction point 50, and thus the closure of the switch 80 charges the capacitor 82 and impresses a pulse upon the control electrode 37 to drive the latter positive. A capacitor 83 is connected between conductor 81 and ground to reduce the possibility of any switching transients being introduced into the control circuit just described from adjacent circuits or equipment, and a resistor 84 is connected between the terminals of the capacitor to discharge the latter.

To secure the pulse necessary to render the section 30 of the electron discharge tube conductive, thereby preventing the transmission of the signal from the input conductor 10 to the output conductor 11, a conductor 85 is connected to the junction point 47, and is connected to one terminal of each of a series of capacitors 86*b*, 86*c*, 86*d*, etc. As hereinafter explained, the other terminal of each of these last-mentioned capacitors is connected to a conductor corresponding to the conductor 81 of the section A. Consequently, when one of the other switching sections is energized to transmit its corresponding input signal to the output cable 11, the control voltage that is applied for this purpose also acts to charge one of the capacitors 86*b*, 86*c*, 86*d*, etc. The pulse thereby transmitted to the conductor 85 acts to drive the control electrode 33 positive, thus rendering the section 30 of the electron discharge tube conductive and preventing the further transmission of the signal from the input conductor 10.

In order that the operation of the various switching sections may be controlled from a distance, a conductor 87 is connected to the conductor 81, and extends to one terminal of a remotely located switch 80*a*, the other terminal of which is connected to the power supply terminal 46. Similarly, a conductor 88 is connected to the junction point of the neon glow lamp 75 and the resistor 76, and extends to a remotely located indicator lamp 75*a*, likewise also connected to the terminal 46. The conductors 87 and 88 may extend to a master control panel (not shown) or any other suitable location where it is desirable to have auxiliary control and indicating means for the various switching sections.

To control the signal from the input cable 110, the switching section B is provided that is identical in all respects with the switching circuit A previously described. Similar parts are given similar numbers with the exception that the items in switching section B are in the 100 series, while the items in section A carry numbers lower than 100. Thus, the control switch operating switching section B is designated by the numeral 180, corresponding to the switch 80 of section A, and this switch is connected by conductor 181 to one terminal of a capacitor 182, the other terminal of which is connected to a junction point 150, corresponding to the junction point 50 of the first-mentioned section. A conductor 187, corresponding to the conductor 187 of section A, is connected to conductor 181 and extends to a remotely located control switch 180*a*.

In addition, conductor 187 is also connected to one terminal of the capacitor 86*b*, previously mentioned, the other terminal of which is connected to conductor 85. It will thus be seen that when switch 180 is closed, conductor 187 is energized to charge capacitor 86*b*, and consequently a pulse is delivered to junction point 47 of switching section A, thereby driving the control electrode 33 of the section 30 of the electron discharge tube positive. Similarly, the closing of switch 80 to place switching section A in signal transmitting condition energizes conductor 87 to charge capacitor 186*a*, so that a pulse is delivered to junction point 147 to place switching section B in non-transmissive condition.

It is desirable, of course, to be able to render all of the switching sections simultaneously non-transmissive, and to accomplish this, it is only necessary to provide an "off" switch 90 having one terminal connected to the conductor 78 and the other terminal connected to a conductor 91. Conductor 91, like conductors 87, 187, etc., is connected to one terminal of each of the capacitors 86*x*, 186*x*, etc. In this way, a pulse is delivered to each of the junction points 47, 147, etc., to simultaneously render all of the switching sections A, B, etc., non-transmissive.

In connection with the interlocking arrangement thus provided, it will be noted that conductor 87, energized when switch 80 is closed, is not connected to transmit a pulse to junction point 47, though such a pulse is transmitted to junction points 147, 247, etc. of switching sections B, C, etc. Similar circuitry is provided for each of the other switching sections, and thus all of the switching sections are rendered non-transmissive except the particular section whose control switch is closed.

The values of the various components used in the complete switching system are identical with those previously listed in connection with the section shown in Fig. 1, and the value of the additional components is given herewith.

| Resistors | Value |
|---|---|
| 76 ......ohms | 30,000 |
| 77 ......do | 50 |
| 84 ......megohms | 2 |

*Capacitors*

| | |
|---|---|
| 86*b*, 86*c*, 86*d*, 86*x*, 186*a*, 186*c*, 186*x*, etc | 10 μμf. |
| 82 | 10 μμf. |
| 83 | .001 μf. |

The results obtained from the use of this switching system have been very satisfactory, and it has been found that it requires approximately four to five microseconds to switch the output cable 11 from one input cable to another. Such speed of switching suggests that a system of this type may be used with suitable auxiliary equipment to interrupt the signal from one input cable and substitute another for it. It will be apparent to those skilled in the art, that in this manner one television image may appear to be "wiped" from the image tube by another image, thus giving the effect of the well-known "wipe" used in motion picture photography.

From the foregoing, it will be apparent to those skilled in the art that I have provided a greatly improved and very satisfactory switching means fully capable of achieving the objects and advantages hereinbefore set forth. It will be apparent, however, that variations may be made in the system without departing from the novel features thereof. Consequently, I do not wish to be limited to the particular values of the various components nor to the exact method of connection herein described and shown, except as limited by my claims.

I claim:

1. A switching system of the class described which includes: a plurality of switching elements each comprising an input terminal, an output terminal, a network having a pair of branches connected in parallel, one of said branches being connected to said input terminal and the other being connected to said output terminal, each of said branches including a rectifier therein, and control means connected to the common points of said branches, selectively operable to apply a potential difference to said points with a first polarity to cause current to flow through said rectifiers, whereby a signal is transmitted from said input terminal to said output terminal, or operable to apply a potential difference to said points, greater than the amplitude of said signal, and with a polarity that is the reverse of said first polarity, whereby current does not flow through said rectifiers and said signal is not transmitted from said input terminal to said output terminal; means connecting all of said output terminals in parallel; and a plurality of switching means each associated with one of said switching elements but connected to all of said switching elements and operable to actuate the control means of said associated switching element to render its network signal transmissive and simultaneously to actuate the control means of the remainder of said switching elements to render their networks non-transmissive regardless of their previous condition, whereby no more than a single switching element may be transmissive at any time, said switching means being selectively operable in any sequence.

2. A switching system of the class described which includes: a plurality of switching elements each comprising an input terminal, an output terminal, a network having a first branch comprising a first and second rectifier connected in series to conduct current in the same direction through said branch, said input terminal being connected to the point of common connection of said rectifiers, and a second branch comprising a third and fourth rectifier connected in series to conduct current in the same direction through said second branch, said output terminal being connected to the point of common connection of said third and fourth rectifiers, said first and second branches being connected in parallel to conduct current from a first common point to a second common point, and a trigger circuit connected to said common points to apply a potential difference therebetween, said trigger circuit being selectively operable in either of two stable conditions, the first of said conditions applying a voltage whose polarity renders said first common point positive with respect to said second common point, and the second of said conditions applying a voltage whose polarity renders said second common point positive with respect to said first common point, whereby said network transmits a signal from said input terminal to said output terminal when said trigger circuit is in said first condition, and said network prevents said transmission of said signal when said trigger circuit is in said second condition; means connecting all of said output terminals in parallel; and a plurality of switching means each associated with one of said switching elements but connected to all of said switching elements and operable to actuate the trigger circuit of said associated switching element to render its network signal-transmissive and simultaneously to actuate the trigger circuits of the remainder of said switching elements to render their networks non-transmissive regardless of their previous condition, whereby no more than a single switching element may be transmissive at any time, said switching means being selectively operable in any sequence.

3. A switching system of the class described which includes: a plurality of switching elements each comprising an input terminal, an output terminal, a network connecting said input and output terminals, having a pair of branches each including a rectifier therein and each extending from a first common point to a second common point, and a trigger circuit connected to said first and second common points, operable to provide a voltage therebetween whose polarity is selectively reversible between a first condition where said network is rendered signal-transmissive and a second condition where said network is rendered non-transmissive; means connecting all of said output terminals in parallel; and a plurality of switching means each associated with one of said switching elements but connected to all of said switching elements and operable to actuate the trigger circuit of said associated switching element to render its network signal-transmissive and simultaneously to actuate the trigger circuits of the remainder of said switching elements to render their networks non-transmissive regardless of their previous condition, whereby no more than a single switching element may be transmissive at any time.

4. A switching system of the class described which includes: a plurality of switching elements each comprising an input terminal, an output terminal, a network connecting said input and output terminals, having a pair of branches each including a rectifier therein and each extending from a first common point to a second common point, and a trigger circuit connected to said first and second common points, operable to provide a voltage therebetween whose polarity is selectively reversible between a first condition where said network is rendered signal-transmissive and a second condition where said network is rendered non-transmissive; means connecting all of said output terminals in parallel; and a plurality of momentary contact switches each associated with one of said switching elements and connected to the trigger circuit thereof to provide a pulse to drive said trigger circuit to its first operating condition and thereby render the network associated therewith signal-transmissive, each of said switches also being connected to the trigger circuits of the remainder of said switching elements to simultaneously provide a pulse to said last-mentioned trigger circuits to drive them to their second operating condition and thereby render the networks associated therewith non-transmissive regardless of the previous condition of said network, whereby no more than a single switching element may be transmissive at any time.

5. A switching system of the class described which includes: a plurality of switching elements each comprising an input terminal, an output terminal, a network connecting said input and output terminals, having a pair of branches each including a rectifier therein and each extending from a first common point to a second common point to conduct current from said first to said second common point, and a trigger circuit connected to said common points to apply a potential difference therebetween, said trigger circuit being selectively operable in either of two stable conditions, the first of said conditions applying a voltage whose polarity renders said first common point positive with respect to said second common point, and the second of said conditions applying a voltage whose polarity renders said second common point positive with respect to said first common point, whereby said network transmits a signal from said input terminal to said output terminal when said trigger circuit is in said first condition, and said network prevents said transmission of said signal when said trigger circuit is in said second condition; means connecting all of said output terminals in parallel; and a plurality of switching means each associated with one of said switching elements but connected to all of said switching elements and operable to actuate the trigger circuit of said associated switching element to render its network signal-transmissive and simultaneously to actuate the trigger circuits of the remainder of said switching elements to render their networks non-transmissive regardless of the previous condition of said networks, whereby no more than a single switching element may be transmissive at any time, each of said switching means being inoperative to render the network of its associated switching element non-transmissive.

6. A switching system of the class described which includes: a plurality of switching elements each comprising an input terminal, an output terminal, a network connecting said input and output terminals, having a pair of branches each including a rectifier therein and each extending from a first common point to a second common point, a trigger circuit connected to the common points of said branches to apply a potential difference between said points, said trigger circuit being selectively operable in either of two stable conditions, the first of said conditions applying a voltage to said points having a polarity such that said rectifiers conduct current and transmit a signal from said input terminal to said output terminal, and the other of said conditions applying a voltage to said points of reverse polarity so that said rectifiers prevent the flow of current through said branches and prevent the transmission of said signal from said input terminal to said output terminal; means connecting all of said output terminals in parallel; a plurality of switching means each associated with one of said switching elements but connected to all of said switching elements and operable to actuate the trigger circuit of said associated switching element to render its network signal-transmissive and simultaneously to actuate the trigger circuits of the remainder of said switching elements to render their networks non-transmissive regardless of the previous condition of said networks, whereby no more than a single switching element may be transmissive at any time; and an additional switching means connected to all of said switching elements, operable to actuate all of said trigger circuits of said switching elements to render all of said networks non-transmissive.

7. A switching system of the class described which includes: a plurality of switching elements each comprising a network having an input terminal, an output terminal, and first and second control terminals, said network being characterized by its transmission of a signal from said input to said output terminal when a potential difference of a first polarity is applied to said control terminals, and a non-transmission of said signal when a potential difference of a second, reversed, polarity is applied to said control terminals, and a trigger circuit connected to both of said control terminals, operable in either of two stable conditions, the first of which applies a potential difference of said first polarity to said control terminals, while the second applies a potential difference of said second polarity thereto, thereby controlling the transmission or non-transmission of said signal through said network; a plurality of switching means each associated with a corresponding one of said switching elements but connected to all of said switching elements, each of said switching means being operable to actuate the trigger circuit of the associated switching element to place said trigger circuit in said first stable condition and simultaneously to actuate the trigger circuits of the remaining switching elements to place said last mentioned trigger circuits in said second stable condition regardless of their previous condition; and an additional switching means connected to all of said switching elements, operable to place all of said trigger circuits in said second stable condition, thereby preventing transmission of signals from any of said input terminals to said output terminals.

8. A switching system of the class described which includes: a plurality of gate circuits operable to transmit a signal from an input to an output terminal when in a first condition, and to prevent the transmission of said signal when in a second condition; a plurality of trigger circuits each connected to an associated gate circuit and each selectively operable in either a first stable condition maintaining the associated gate circuit in its said first condition, or a second stable condition maintaining said associated gate circuit in its said second condition; a plurality of switches each associated with a corresponding trigger circuit but connected to all of said trigger circuits, each switch being connected to its associated trigger circuit to drive the latter to its first stable condition, and being connected to the remainder of said trigger circuits to drive them to their second stable condition regardless of their previous condition, each of said switches being inoperative to drive its associated trigger circuit to its second stable condition; and an additional switch connected to all of said trigger circuits, operable to drive all of said trigger circuits to their second stable position.

9. A switching system of the class described which includes: a plurality of gate circuits operable to control the transmission of a signal from an input to an output terminal; a plurality of trigger circuits each connected to an associated gate circuit for controlling the operation thereof, each of said trigger circuits being selectively operable in either a first stable condition causing the transmission of said signal, or a second stable condition preventing the transmission of said signal; a plurality of switches each connected to an associated trigger circuit to drive said trigger circuit to said first stable condition regardless of its previous condition, each of said switches being inoperative to drive its associated trigger circuit to said second stable condition, and each of said switches being connected to the remainder of said trigger circuits to drive said last-mentioned trigger circuits to their second stable condition regardless of their previous conditions, the driving of all of said trigger circuits occurring simultaneously as a result of a single pulse from any one of said switches; and an additional switch connected to all of said trigger circuits, operable to drive all of said trigger circuits to their second stable condition simultaneously regardless of their previous condition.

10. A switching system of the class described which includes: a plurality of gate circuits operable to control the transmission of a signal from an input to an output terminal; a plurality of trigger circuits each connected to an associated gate circuit for controlling the operation thereof, each of said trigger circuits having a pair of condition-controlling terminals, one of said terminals, when energized, causing the operation of said trigger circuit in a first stable condition that causes the transmission of said signal, the second of said terminals, when energized, causing the operation of said trigger circuit in a second stable condition that prevents the transmission of said signal; a plurality of switches each connected to said one of said terminals of an associated trigger circuit to drive said associated trigger circuit to its first stable condition, each of said switches being connected through a capacitor to each of the second of said terminals of the remaining trigger circuits to drive said remaining trigger circuits to their second stable condition, each of said switches being operative to drive its associated trigger circuit, and only its associated trigger circuit, to said first stable condition, and simultaneously to drive all of said remaining trigger circuits to said second stable condition regardless of the previous condition of any of said trigger circuits, each of said switches being inoperative to drive its associated trigger circuit to said second stable condition; and an additional switch capacitively connected to each of said second of said terminals of all of said trigger circuits to drive all of said trigger circuits to said second stable condition.

WAYNE R. JOHNSON.

REFERENCES CITED

The following references are of record in the file of this patent:

UNITED STATES PATENTS

| Number | Name | Date |
|---|---|---|
| 1,765,538 | Nelson | June 24, 1930 |
| 1,979,484 | Mathes | Nov. 6, 1934 |
| 2,250,284 | Wendt | July 22, 1941 |
| 2,366,577 | Thompson | Jan. 2, 1945 |
| 2,369,662 | Deloraine et al. | Feb. 20, 1945 |
| 2,426,454 | Johnson | Aug. 26, 1947 |
| 2,443,195 | Pensyl | June 15, 1948 |
| 2,464,353 | Smith et al. | Mar. 15, 1949 |

FOREIGN PATENTS

| Number | Country | Date |
|---|---|---|
| 108,213 | Great Britain | Aug. 2, 1917 |